No. 788,130. PATENTED APR. 25, 1905.
F. B. COOK.
COMBINED CABLE HEAD AND POLE HOUSE.
APPLICATION FILED DEC. 28, 1903.
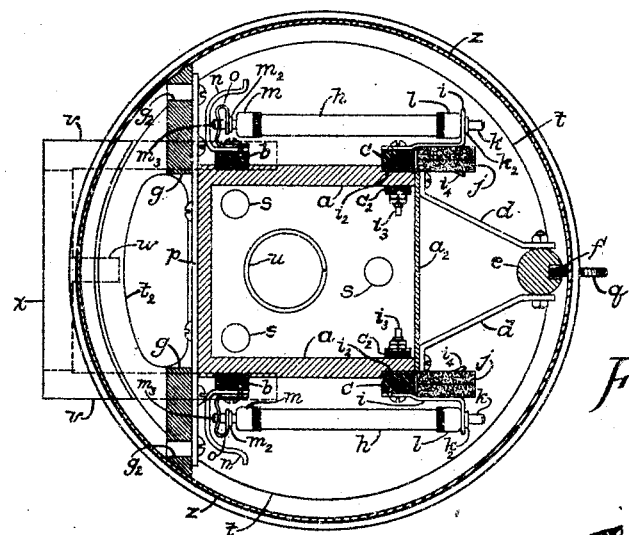
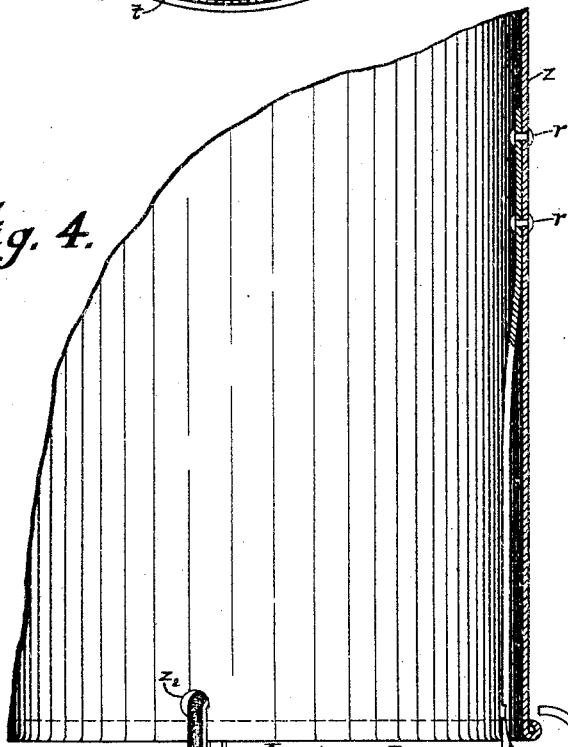

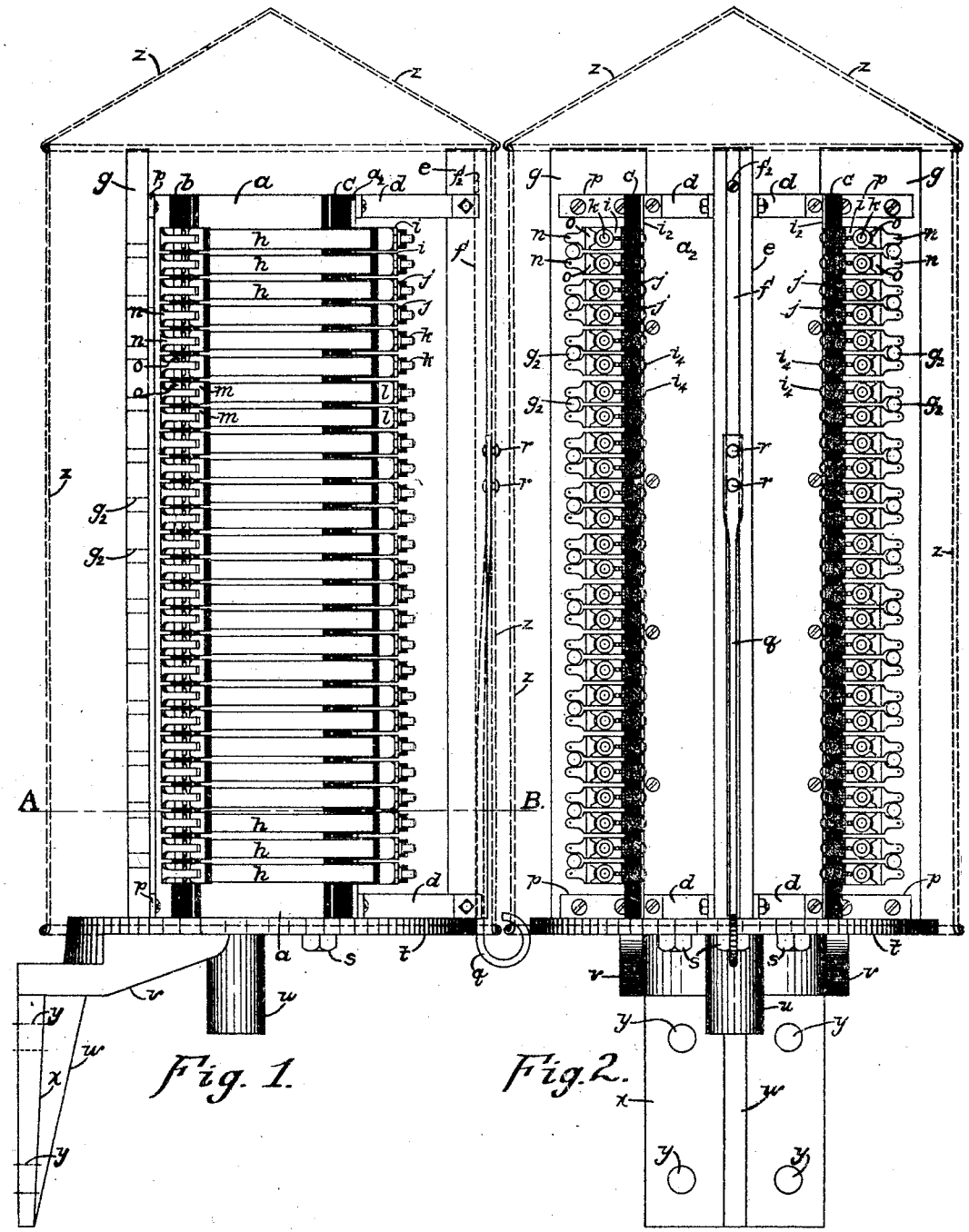

No. 788,130.

Patented April 25, 1905.

UNITED STATES PATENT OFFICE.

FRANK B. COOK, OF CHICAGO, ILLINOIS.

COMBINED CABLE-HEAD AND POLE-HOUSE.

SPECIFICATION forming part of Letters Patent No. 788,130, dated April 25, 1905.

Application filed December 28, 1903. Serial No. 186,806.

*To all whom it may concern:*

Be it known that I, FRANK B. COOK, a citizen of the United States, residing at Chicago, in the county of Cook and State of Illinois, have invented new and useful Improvements in a Combined Cable-Head and Pole-House, of which the following is a full, clear, concise, and exact description, reference being had to the accompanying drawings, forming a part of this specification.

My invention relates to protective apparatus for telephone or telegraph cables and lines, and has for its object a convenient compact arrangement of such apparatus which may be readily and efficiently utilized for protecting said cables and lines. While I have mentioned this protective apparatus as being especially designed for telephone or telegraph circuits, it may also be used in connection with other forms of electrical circuits where such protection is desired.

Another object of my invention is to provide a cover for the protective apparatus and to also provide means for holding the said cover when it is lifted and for locking it when it is down in place.

In this invention I employ the ordinary iron cable-head and arrange a series of lightning-arresters and fuses on opposite sides of the head. The fuses employed are preferably of the tubular type and are provided with connecting-springs, which automatically clamp them in place. The said fuses are adapted to be connected with the respective lightning-arresters as protectors for respective electrical conductors.

The cover for the cable-head is preferably supported at three places, one support being a spring-support adapted to secure the said cover in any position to which it may be lifted when it is desired to have access to the protective apparatus. A lock is also provided for locking the said cover to the base of the cable-head support.

The cable-head support is preferably an iron bracket upon which the cable-head is secured and is adapted to be secured to a pole or other means of support.

The cable-head is provided with a passageway through which the incoming conductors enter the said head, and the cable-head support is provided with an aperture therein, through which the outgoing conductors pass on their way from the pole-house or cable-head cover.

I will more particularly describe my invention by reference to the accompanying drawings, illustrating same, in which—

Figure 1 is a side elevation of the cable-head and pole-house, showing a series of tubular fuses on one side of the cable-head, the pole-house being shown in dotted lines. Fig. 2 is another side elevation of the cable-head and pole-house, showing the ends of the fuses and lightning-arresters on both sides of the cable-head, the pole-house being shown in dotted lines. Fig. 3 is a cross-sectional view of the cable-head and pole-house, taken on line A B of Fig. 1; and Fig. 4 is a cross-sectional view of a portion of the pole-house, showing the spring-support and lock for same.

Like characters refer to like parts in the several figures.

The iron cable-head $a$ is seated on the metal plate $t$, where it is secured by bolts $s\ s\ s$. The metal plate $t$ is a part of the bracket $x$ and is strengthened by the arms $v\ v$ and the rib $w$. The bracket $x$ is provided with holes $y\ y$ therein for securing same to a pole or any suitable support. The plate $t$ is provided with an aperture $t^2$ therethrough for accommodating the conductors leading to the connection-terminals of the protective devices. Passing through the plate $t$ is a pipe $u$, which forms a passage to the inner part of the iron cable-head $a$, through which the cable conductors pass to their binding-posts on the inner surface of the head $a$. A plate $a^2$ is secured to the front side of the head $a$, thus forming an inclosed space within the head $a$. Strips $d\ d$ are secured to the plate $a^2$ and are adapted to hold a bar $e$. The bar $e$ is preferably of wood and rests upon the plate $t$ at its lower end. Two strips $g\ g$ are held in a vertical position by the metal pieces $p\ p$. Strips $g\ g$ are preferably of wood and rest upon the plate $t$ at their lower ends. A cover $z$, preferably of sheet metal, is placed over the strips $g\ g$ and the bar $e$, thus inclosing the cable-head and protective apparatus, as shown. The cover $z$ is provided with a spring $q$, secured thereto by rivets $r\ r$. The bar $e$ is provided with a slot $f$ therein, in which the spring $q$ rests when the cover $z$ is in place. This spring $q$ holds the cover $z$ against the strips $g\ g$, and thereby holds the said cover in a secure but removable position. When the cover $z$ is raised or lowered, the spring $q$ slides in the slot $f$, serving all the time as a support for the said cover. The tension in the spring $q$ is sufficient to cause the cover to stay in whatever position it may be placed, whether part way down or clear down over the cable-head. Near the top of slot $f$ is a small pin $f^2$, adapted to engage a notch $q^2$ in spring $q$, and thereby form a catch for the said cover when it is lifted nearly to the top of bar $e$ to allow free access to all of the protective devices. When the cover $z$ is again lowered, the notch $q^2$ is first disengaged from the pin $f^2$. Near the bottom of cover $z$ is provided a hole $z^2$. A lock $z^3$ is adapted to be locked through the hole $z^2$, as shown in Fig. 4. When the cover $z$ is pulled down below the plate $t$ and the lock $z^3$ is locked through the hole $z^2$, the cover $z$ is locked to the plate $t$, due to the lock being too large to pass between the cover $z$ and the plate $t$. The cover $z$ is preferably galvanized to protect it from the weather. The iron head $a$ is preferably closed at its top and bottom ends, the said ends being continuous with the side portions. On opposite sides of the head $a$ are arranged series of protective devices, and as the said devices on one side of head $a$ are similar and arranged similar to those on the opposite side of $a$ I will describe in detail the devices on one side only of the said head.

The insulating-strips $b$ and $c$, preferably of hard rubber, are suitably secured to the head $a$, resting in respective grooves in the said head. A series of rigid connection-terminals $n\ n$ are secured to the strip $b$ and are all insulated from each other. A series of springs $o\ o$ are conductively secured to the respective terminals $n\ n$. A ground-strip $i^2$ is held between the insulating-strip $c$ and the head $a$, making contact with the head $a$. The ground-strip $i^2$ is provided with a series of projections $i^4\ i^4$ thereon, adapted to engage a series of carbon lightning-arresters $j\ j$. A series of springs $i\ i$ are secured to the insulating-strip $c$ and are all insulated from each other. The lightning-arresters $j\ j$ are inserted between the respective springs $i\ i$ and the respective projections $i^4\ i^4$ of the ground-strip $i^2$. A series of binding-posts $i^3\ i^3$ pass through the respective springs $i\ i$, the insulating-strip $c$, the ground-strip $i^2$, and the head $a$, thereby securing the springs $i\ i$, the insulating-strip $c$, and the ground-strip $i^2$ in place. The binding-posts $i^3\ i^3$ are insulated from the head $a$ and from the ground-strip $i^2$, by respective insulating-bushings $c^2\ c^2$. A series of tubular fuses $h\ h$, each fuse being provided with conducting end caps $l$ and $m$, connecting-lugs $k$ and $m^3$ for the end caps $l$ and $m$, respectively, and annular projections $k^2$ and $m^2$ for the lugs $k$ and $m^3$, respectively, are adapted to engage respective springs $o\ o$ at one end of the fuses and respective springs $i\ i$ at the other end of the fuses. A connecting-lug $m^3$ is inserted through two holes in the spring $o$, and then the lug $k$ is pressed in place into a slot in spring $i$, spring $o$ exerting a torsion on $m^3$ and spring $i$ engaging the lug $k$ between the annular projection $k^2$ and the cap $l$, as shown in Fig. 3. Thus springs $o$ and $i$ automatically clamp the fuse $h$ in place. The tubular fuse and clamping arrangement for same which I preferably show in this invention are shown, described, and claimed in my application, Serial No. 179,799, filed November 4, 1903, for fuses, and later in my application, Serial No. 215,942, filed July 9, 1904, for electric fuse, which was filed to take the place of said application No. 179,799. The ends of this fuse are similar, thus making the fuse reversible.

The wooden strips $g\ g$ are each provided with a series of holes $g^2\ g^2$ therein, through which the circuit-conductors pass to the connection-terminals $n\ n$.

As seen in Fig. 3, the circuit of a single conductor is from the tube $u$, where it enters the cable-head $a$, to a binding-post $i^3$, through binding-post $i^3$, spring $i$, end cap $l$, tubular fuse $h$, end cap $m$, lug $m^3$, spring $o$, connection-terminal $n$, from connection-terminal $n$, through hole $g^2$ and out from under the pole-house through aperture $t^2$ in plate $t$. When an abnormally large current traverses this circuit, the fuse $h$ blows, and thus opens the circuit. When a high-potential electric current or discharge, such as lightning, comes in over this circuit, it discharges from spring $i$ through the lightning-arrester $j$ to the ground-strip $i^2$, which is connected to earth.

The cable is preferably connected with the pipe $u$, and the aerial conductors preferably pass through the aperture $t^2$. When an abnormally large current comes in over the aerial line, it blows the fuse and thus opens the line, whether the lightning-arrester is short-circuited or not. Should the aerial line first come to the lightning-arrester, as it would if connected to binding-post $i^3$, the abnormally large current coming therefrom may not blow the fuse if the lightning-arrester is short-circuited. In this latter case the aerial line would not be opened, and hence would have no protection whatever. The heavy current would simply pass to earth through the lightning-arrester and probably burn out the aerial line.

While I have shown and described particular details of construction, I do not wish to confine this invention to such particular details. The general arrangement of the apparatus is what I desire to hereinafter claim.

Having thus described my invention, what I claim as new, and desire to secure by Letters Patent, is—

1. The combination with a cable-head, of a series of tubular fuses for each of two opposite sides of the cable-head and mounted thereon, mounting-springs for the respective fuses adapted to automatically clamp the fuses in place, a series of lightning-arresters for each of the said two opposite sides of the cable-head and mounted between the respective series of fuses and the cable-head, each lightning-arrester engaging a fuse-clamping spring as a connection-terminal and having one end exposed to permit of free access thereto, and means for connecting the said fuses and lightning-arresters as protective devices for electric circuits, substantially as described.

2. The combination of a hollow cable-head having one open side, a lid for the said open side of the cable-head and removably mounted thereon, a cylindrical cover for the cable-head, three parallel supports for the cover, and a plate on which the cable-head is mounted, provided with apertures therethrough through which conductors pass to the inner part of the cable-head and also from the said cover, respectively, substantially as described.

3. The combination with a cable-head, of a circular plate on which the head is mounted, a cylindrical cover for the cable-head and adapted to fit over said plate, three parallel guides for the said cover and secured to the cable-head, a spring attached to the cover and adapted to slide on one guide, the said spring being adapted to hold the said cover to the other guides, and a catch for the said spring, adapted to engage same when the cover is lifted, substantially as described.

4. The combination with a cable-head, of a circular plate to which the head is secured, the said plate forming part of a bracket for mounting the cable-head to some means of support, a cover for the cable-head provided with a hole therethrough near the open end thereof, three parallel guides for the said cover, and a lock adapted to be locked through the said hole only and thereby lock the said cover in place when same is placed over the cable-head, the lock engaging the said plate when the cover is slightly lifted, substantially as described.

5. The combination with a cable-head, of a plate on which same is mounted, a cover for the cable-head, a spring secured to the inner side of the cover, three supports for the said cover, one support being provided with a groove therein in which the said spring rests, a notch in the said spring, and a pin in the said groove adapted to engage the said notch when the cover is lifted and thereby secure the cover in place, the tension in the said spring holding the cover to the said supports and securing it in whatever position it may be placed, substantially as described.

6. The combination with a cable-head and protective devices mounted thereon, of a cylindrical, sheet-metal cover for same, parallel supports for the cover, one support being provided with a longitudinal groove therein, the other supports being provided with holes therethrough for conductors leading to the protective devices, a spring secured to the said cover and adapted to slide in the said longitudinal groove, a bracket-support to which the cable-head is secured, and means whereby the protective devices may be connected as protectors to electrical circuits, substantially as described.

7. The combination with a cable-head, of a series of tubular fuses mounted upon opposite sides of the head, a ground-strip on the said opposite sides of the head, a series of lightning-arresters mounted between the series of fuses and the ground-strip, springs for each fuse which automatically clamp the fuses in place, a circular plate upon which the cable-head is mounted, provided with an aperture therein through which the line conductors pass, the said plate being part of a supporting-bracket for the cable-head, a tube extending through the said plate and forming an opening into the hollow portion of the cable-head, suitable binding-posts on the inner surface of the cable-head, the said binding-posts being connected to the respective protective devices, strips provided with holes through which the line conductors pass, the said strips forming supports for a cover, a third strip also forming a support for the cover, a cylindrical cover adapted to inclose the whole, a spring secured to the said cover and adapted to engage the said third strip and thereby secure the cover in position, and means for connecting the said fuses and lightning-arresters as protectors for electrical circuits, substantially as described.

8. The combination with a cable-head, of a series of tubular fuses therefor, clamping-springs for the respective fuses, suitably mounted on the cable-head and adapted to automatically clamp the fuses in place, one clamping-spring for each fuse exerting a torsion on a portion of the latter when same is in place, and suitable connection-terminals for the respective circuit-conductors, substantially as described.

9. The combination with a hollow, inclosed, cable-head, of a series of fuses mounted upon an exterior surface thereof and extending parallel with the said surface, spring clamping devices for mounting the said fuses, suitably mounted on the cable-head and adapted to automatically clamp the fuses in place, one spring clamping device for each fuse exerting a torsion on a portion of the fuse when same is in place, and suitable connection-terminals for the respective fuses, one connection-terminal for each fuse being within the hollow cable-head, substantially as described.

10. The combination with a hollow, inclosed, cable-head, of a series of tubular fuses mounted upon an exterior surface thereof and extending parallel with the said surface, spring clamping devices for the respective fuses suitably mounted on the cable-head and adapted to automatically clamp the fuses in place, a ground-plate conductively secured to the cable-head, lightning-arresters mounted between the respective fuses and the ground-plate and each having one end freely exposed to permit of free access thereto, and suitable connection-terminals for the fuses and lightning-arresters, one connection-terminal for each fuse and its lightning-arrester being within the hollow cable-head, substantially as described.

11. The combination with a cable-head, of a series of tubular fuses for each of two opposite sides thereof and mounted thereon so that the fuses extend parallel with the said sides of the cable-head, spring clamping devices for mounting the respective fuses suitably mounted on the cable-head and adapted to automatically clamp the fuses in place, and suitable connection-terminals for the respective circuit-conductors, substantially as described.

12. The combination with a cable-head, of a series of tubular fuses for each of two opposite sides thereof, series of springs mounted on the cable-head and adapted to automatically clamp the fuses in place, one clamping-spring for each fuse exerting a torsion on a portion thereof when same is in place, and suitable connection-terminals for the circuit-conductors, substantially as described.

13. The combination with a hollow, inclosed, cable-head, of a series of fuses for each of two opposite sides thereof, mounted upon exterior surfaces of same and extending parallel with the said sides of the cable-head, spring clamping devices for the respective fuses mounted on the cable-head and adapted to automatically clamp the fuses in place, one spring clamping device for each fuse exerting a torsion on a portion of the fuse when same is put in place, and suitable connection-terminals for the respective fuses, one connection-terminal for each fuse being within the hollow cable-head, substantially as described.

14. The combination with a hollow, inclosed, cable-head, of a series of tubular fuses for each of two opposite sides of the cable-head, mounted upon exterior surfaces thereof and extending parallel with said surfaces, the said fuses being insulated from each other and from the cable-head, spring clamping devices for the respective fuses mounted on the cable-head and adapted to automatically clamp the fuses in place, a ground-plate for each of the said two opposite sides of the cable-head and conductively secured thereto, lightning-arresters mounted between the respective fuses and their ground-plate, and suitable connection-terminals for the fuses and lightning-arresters, one connecting-terminal for each fuse and its lightning-arrester being within the hollow cable-head, substantially as described.

15. The combination with a distributing-head, of a circular plate on which same is mounted, a cylindrical cover adapted to inclose the distributing-head and provided with a hole near the open end thereof, suitable parallel guides for the cover, and a lock adapted to be locked through the said hole only and thereby lock the cover in place when same is placed over the distributing-head, the said lock engaging the plate when the cover is slightly raised, substantially as described.

16. The combination with a cable-head, of a plate on which the head is mounted, a cylindrical cover for the cable-head, suitable parallel guides for the said cover and entirely within same, and a spring attached to the cover and adapted to slide in a groove in one guide and thereby hold the cover to the others.

17. The combination of a hollow, inclosed, cable-head provided with an opening through which conductors pass to the interior thereof, a cylindrical cover for the cable-head, suitable parallel guides for the cover, provided with series of holes through which the circuit-conductors pass, and a circular plate on which the cable-head is mounted, provided with an aperture through which conductors pass from the said cover when same is placed over the cable-head, substantially as described.

In witness whereof I hereunto subscribe my name this 23d day of December, A. D. 1903.

FRANK B. COOK.

Witnesses:
 JNO. F. TOMPKINS,
 CHAS. E. WHITE.